Feb. 14, 1933.　　　C. FASSINGER　　　1,897,385
INSULATOR BRACKET AND METHOD OF MAKING THE SAME
Filed Aug. 4, 1930　　　5 Sheets-Sheet 1
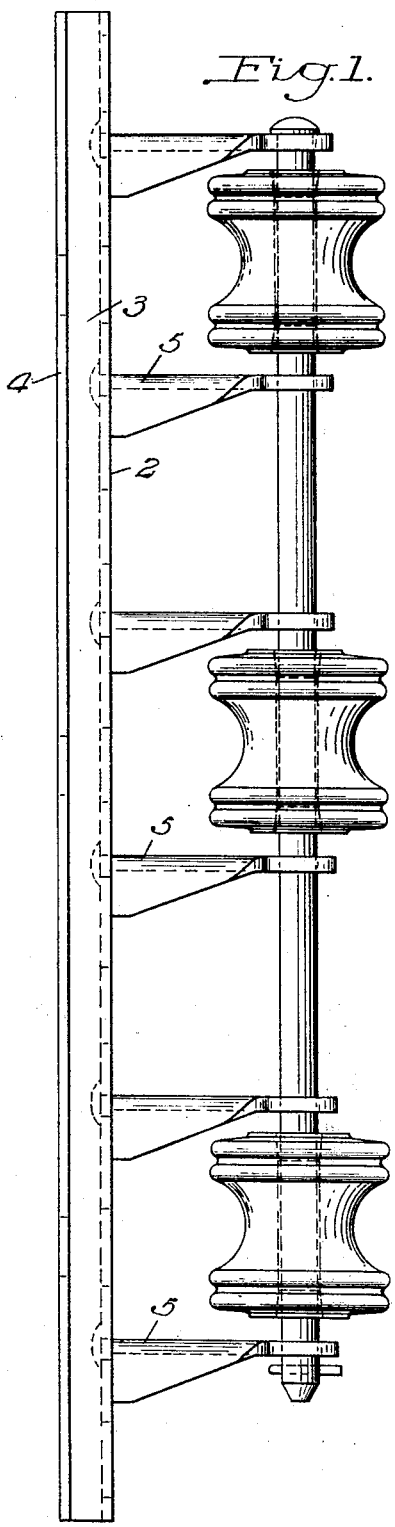
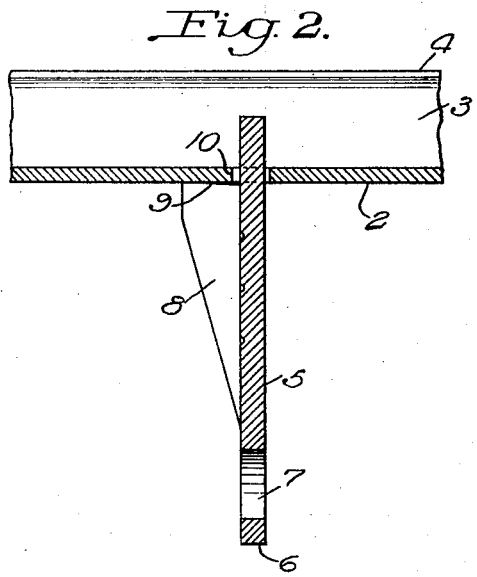
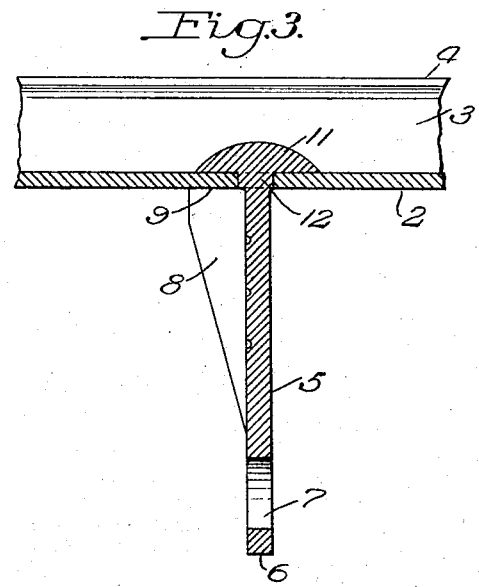
INVENTOR
Charles Fassinger
By Byrnes, Stebbing, Parmelee & Blenko
His Atty's Feb. 14, 1933. C. FASSINGER 1,897,385
INSULATOR BRACKET AND METHOD OF MAKING THE SAME
Filed Aug. 4, 1930   5 Sheets-Sheet 2
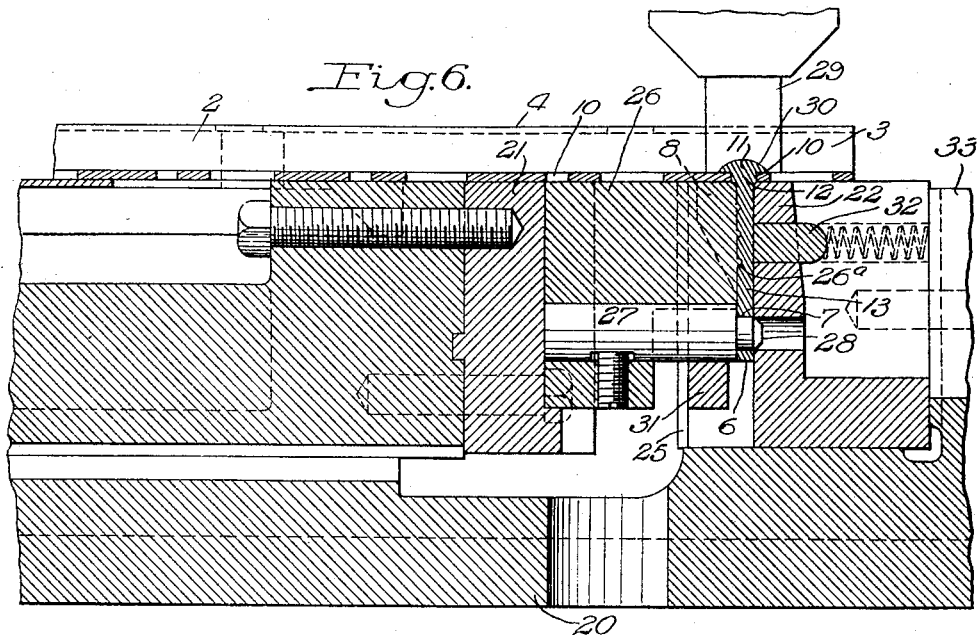
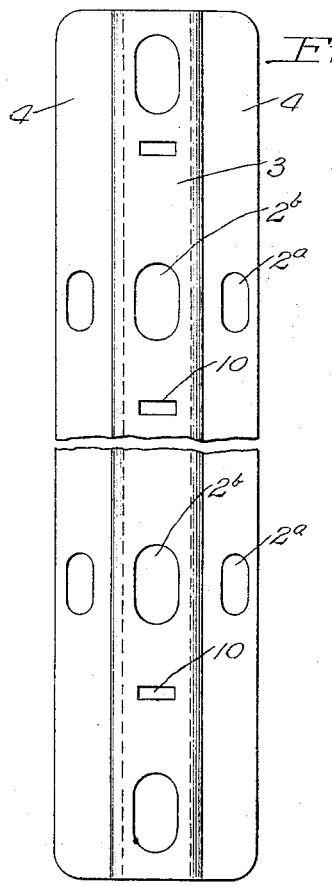
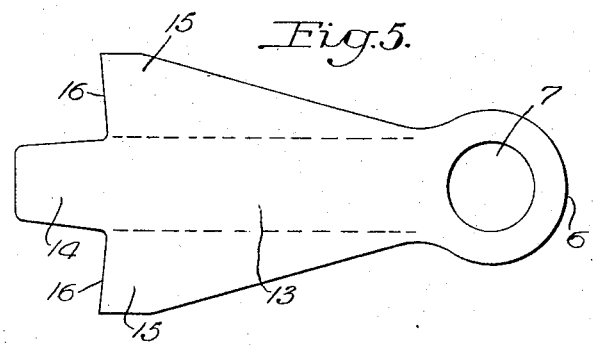
INVENTOR
Charles Fassinger
By Byrnes, Stebbing, Parmelee & Blenko
His Attys.

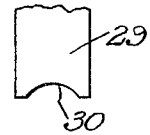
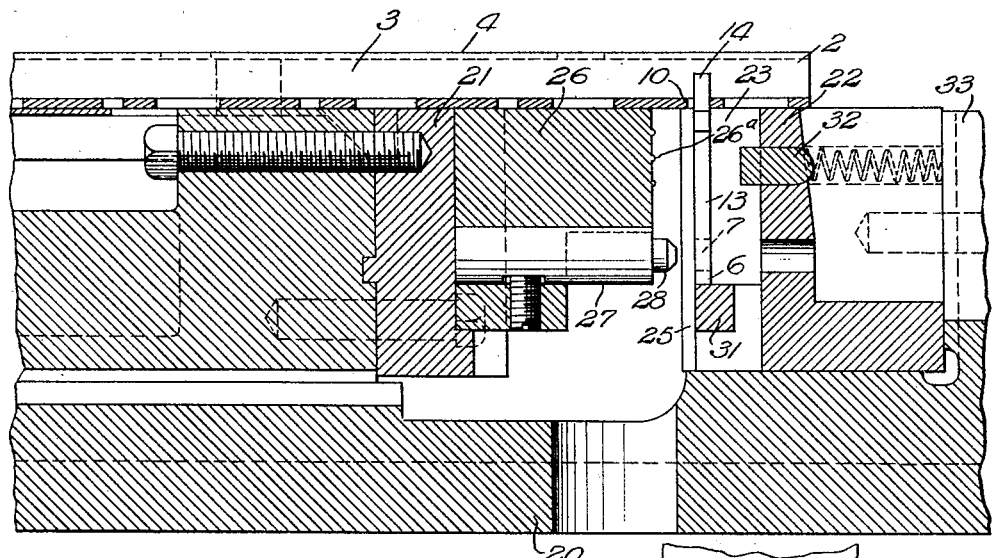
Fig. 7.
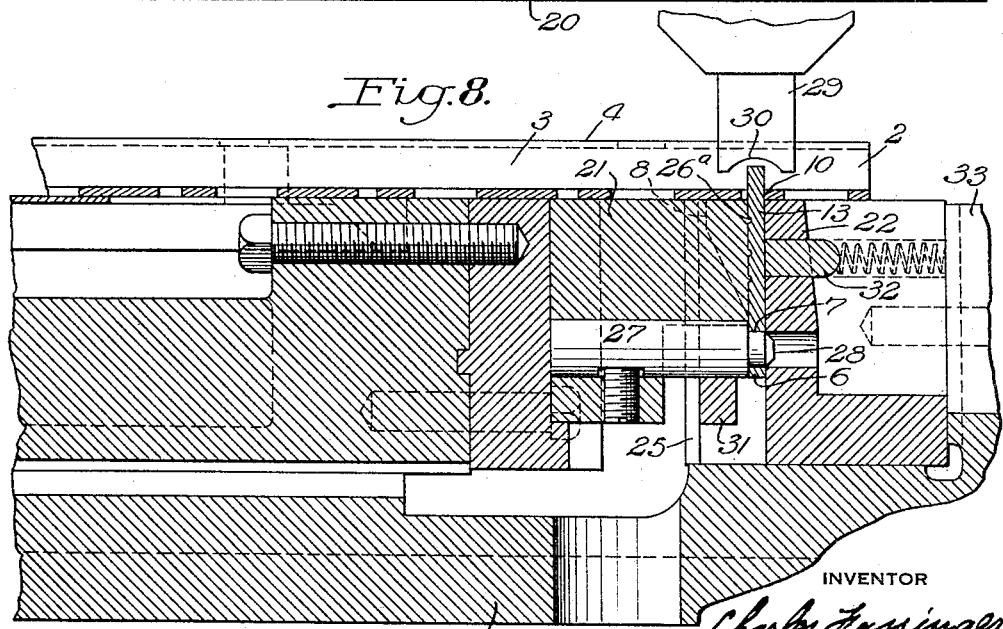
Fig. 8.

Feb. 14, 1933. C. FASSINGER 1,897,385
INSULATOR BRACKET AND METHOD OF MAKING THE SAME
Filed Aug. 4, 1930 5 Sheets-Sheet 4

INVENTOR
Charles Fassinger
By Byrnes, Stebbins, Parmelee & Blenks
His Atty's.

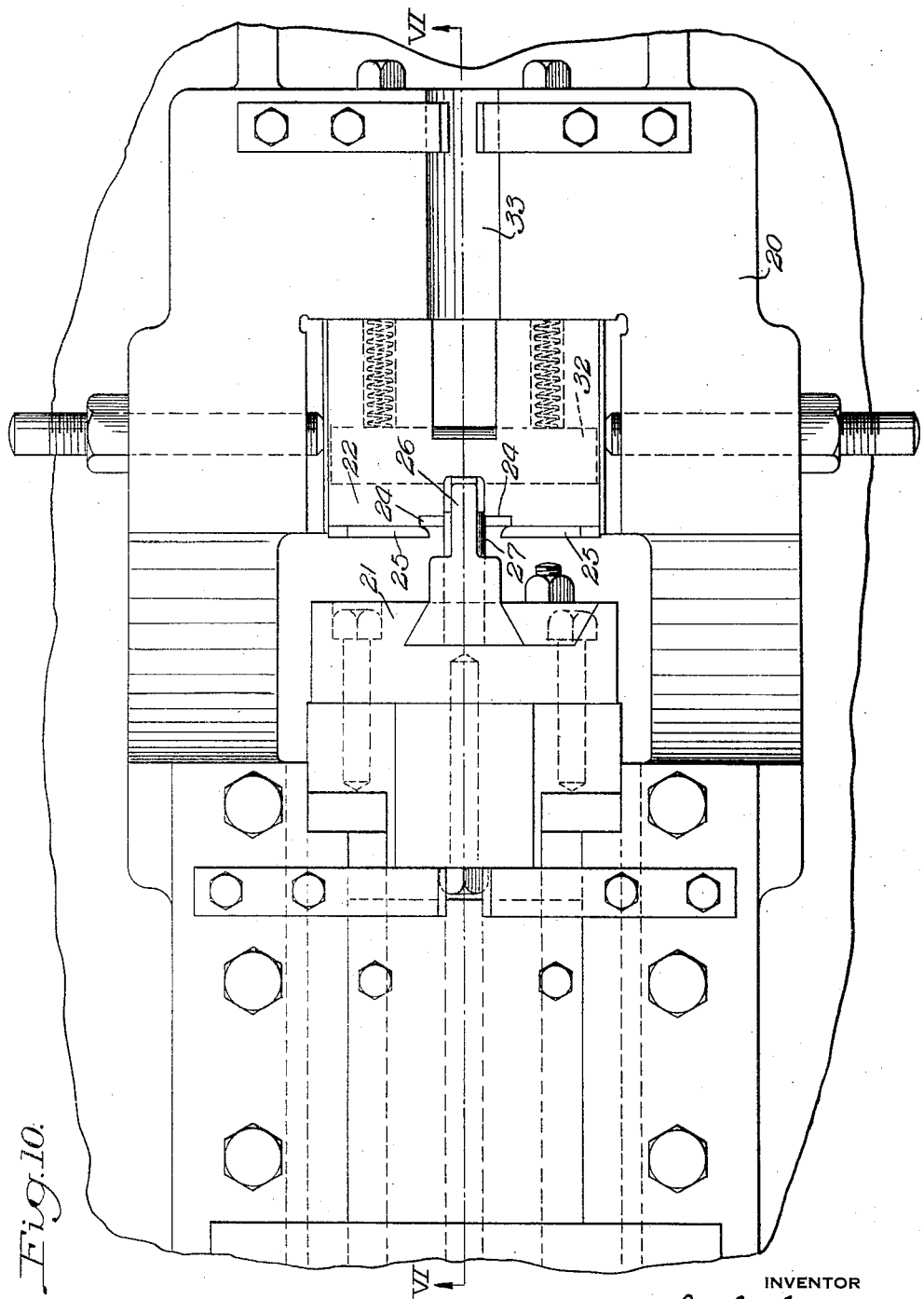

Patented Feb. 14, 1933

1,897,385

UNITED STATES PATENT OFFICE

CHARLES FASSINGER, OF PITTSBURGH, PENNSYLVANIA, ASSIGNOR TO OLIVER IRON & STEEL CORPORATION, OF PITTSBURGH, PENNSYLVANIA, A CORPORATION OF PENNSYLVANIA

INSULATOR BRACKET AND METHOD OF MAKING THE SAME

Application filed August 4, 1930. Serial No. 473,117.

This invention relates to an insulator bracket and the method of manufacturing the same, and particularly to that type of bracket which is known in the pole line hardware industry as a "secondary rack".

Insulator brackets of this general type are extensively used, and as commonly constructed, they comprise a base member having a plurality of horizontally projecting arms thereon. These arms have a hole through the outer end thereof. A single pin passing through a lined hole in the several horizontal arms supports a series of insulators.

As heretofore constructed it has been common practice in the art to form the base of rolled sheet metal and to form the horizontal arms by forging, or by shaping specially rolled structural shapes.

According to the present invention there is provided an insulator rack which may be formed entirely of flat sheet metal, resulting in a considerable economy in the manufacture of the rack. At the same time the rack has ample strength.

The invention may be readily understood by reference to the accompanying drawings in which:

Figure 1 is a side elevation of a completed insulator rack made in accordance with my invention;

Figure 2 is a detail view showing the relation of the base and the sheet metal arm at an intermediate point in the operation of the assembly;

Figure 3 is a similar view showing a portion of the base and one of the arms assembled therein, the view representing a longitudinal vertical section through the rack;

Figure 4 is a plan view of the base before the arms have been placed thereon;

Figure 5 shows one of the sheet metal blanks from which the arm is formed;

Figure 6 is a longitudinal vertical section through the bed of a press specially constructed for making the assembly, the parts showing the finishing step in the manufacture of the bracket, the view being in the plane of line VI—VI of Fig. 10;

Figure 7 is a view similar to Fig. 6 showing the first step in uniting the arm to the base and forming the arm, the view being a section in the plane of line VII—VII of Fig. 9;

Figure 8 is a view similar to Fig. 7 showing the arm bent to shape and the relation of the parts just before the final operation shown in Fig. 6 is effected;

Figure 10 is a view similar to Fig. 9 but with the parts in the position which they assume in Fig. 6.

Figure 9:
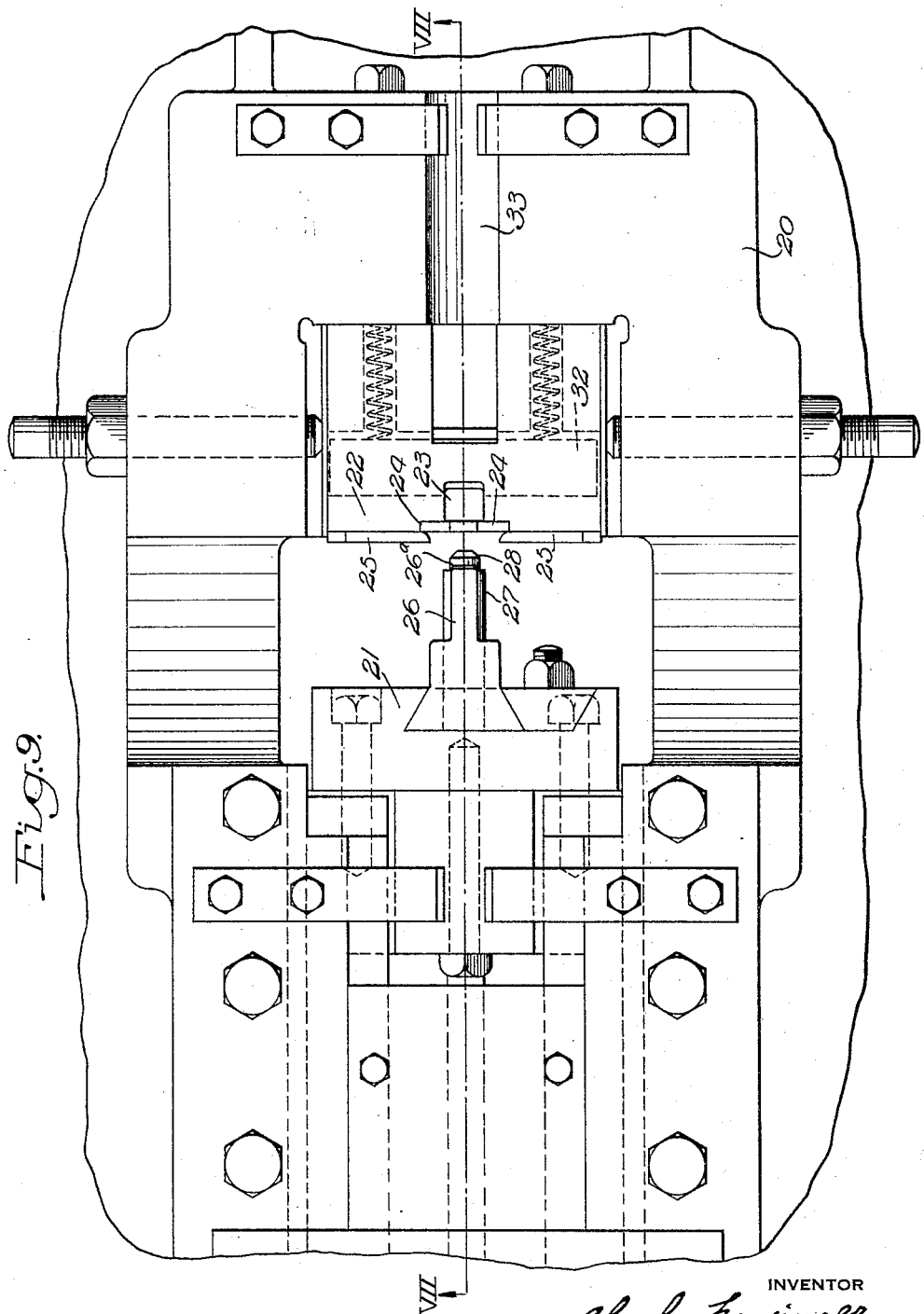
Figure 9 is a top plan view of the bed of the machine when the parts are in the position shown in Fig. 7, the base of the insulator bracket, however, being omitted in order to show the parts of the machine.

In the following description I have specifically shown and described one form of machine for carrying out the process of manufacture of the insulator rack. It will be understood, however, that the invention is not limited to the employment of a particular machine. The machine as herein shown and described constitutes the subject matter of my copending application Serial No. 473,681 filed August 7, 1930.

The construction of the insulator and the general steps in the manufacture thereof are best described in connection with Figs. 1 to 5 of the drawings. The insulator rack comprises a base 2 which is preferably formed by pressing a flat sheet of metal. The base comprises a central rib or channel portion 3 with lateral flanges 4 along each side of the base of the rib. Extending outwardly from the base at substantially right angles thereto are a plurality of arms 5 which are formed of sheet metal. These arms, as disclosed in Fig. 3, have an outer end portion 6 in which is a hole 7. Between the outer end portion 6 and the base are integral downwardly turned flanges 8 which reinforce the arm and impart rigidity thereto. The ends of the flanges 8 are drawn tightly against the outer surface of the channel portion 3 of the base, the point of contact between the downwardly turned flanges and the base being marked 9.

In the manufacture of the base transverse slots 10 are formed therein. Each of the arms 5 has an inner end portion 11 which passes through the slot 10 and which is tightly riveted over on the underside of the channel or rib 3. Between the riveted-over end 11 and the outer portion of the arm there is a transversely thickened portion 12, which is clearly shown in Fig. 3, and which serves to reinforce the arm against shearing strains at this point.

The arm 5 is formed from the blank shown in Fig. 5. This blank is stamped out from flat sheet metal. In Fig. 5 the blank itself is designated 13. On its inner end it has a central tongue 14, and on each side of the central portion of the blank are laterally extending tapered wings 15. The dotted lines in Fig. 5 indicate the lines along which the metal blank is folded to form the wings 15 into the reinforcing flanges 8 previously described. At the outer end of the blank is the hole 7, previously described, and which is punched out when the blank 13 is originally stamped from flat sheet metal. It will be noted by reference to Fig. 5 that the end edges of the wings 15 are cut at a slight angle, as shown by the lines 16, instead of being at right angles to the longitudinal axis of the blank.

In the process of assembling the insulator, the base 2 is shaped up from the flat sheet metal previously stamped to size and the blanks 13 are stamped out of flat sheet. Each blank 13 may be heated to a bright red heat throughout substantially its entire length, with the exception that the outer end portion should be kept relatively cold. When thus heated the tongue 14 of the blank is inserted through one of the openings 10 in the base member 2, the flanges 15 are folded down to form the reinforcing flanges 8, and after this bending operation and while the metal is still hot the end portion 14 is subjected to an upsetting operation. Although I have specified heating the blanks 13 as a step in the above described operation, such step may be omitted and the operation carried out with the blanks cold. This upsetting operation forms the head portion 11 and the thickened or upset part 12. In the upsetting operation the arm 5 is rigidly held against downward movement while the base member 2 is relatively free. The exertion of an enormous pressure against the projecting end portion 14 of the blank not only upsets this metal, but forces the base down into tight engagement with the ends of the wings 8. The arm is thus clamped to the base so tightly that looseness cannot subsequently develop.

During this upsetting operation the angular edges 16 of the blank, after being bent down as shown in Fig. 2, are pressed so tightly against the metal of the base as to contact with the base entirely along the edge 9, the operation serving to more effectively clamp the two pieces together.

In Figs. 7 to 10, inclusive, I have shown the method by which the blank 13 is bent to shape and riveted to the base member 2. This may be described by reference to the machine which I have illustrated for effecting this process. The machine comprises a bed 20 having a laterally reciprocating head 21 which moves toward and away from a stationary die block 22. The die block 22, as clearly shown in Fig. 9, has a substantially U-shaped recess 23 therein. In front of this recess or groove at each side thereof are vertical shoulders 24. Secured to the front of the die block in spaced relation to these shoulders are keeper plates 25.

On the reciprocating head 21 is a cooperating die member 26 which is moved by reciprocation of the head 21 from the position shown in Fig. 9 to the position shown in Fig. 10. In the position shown in Fig. 10 it will be seen that the die 26 is entered in the U-shaped recess or matrix 23. On the reciprocating head 21 below the die member 26 is a pin member 27 having a projection or pin 28 on the forward end thereof the diameter of which is approximately the same as the diameter of the hole 7 in the outer end of the blank 13.

As shown in Figs. 6, 7 and 8, the machine is provided with a plunger 29 which reciprocates vertically over the center of the die 22 and the operation of which is corelated to the operation of the reciprocating head 21 as described in my copending application above-mentioned. On the lower end of the plunger 29 is a die surface 30.

After the blank 13 has been heated as previously described, it is set in the guideway at the front of the notch 23 formed by the shoulders 24 and the keeper plates 25. In Figs. 7 and 9 the flat blank 13 is shown set in the die in the way it is placed while hot. In this position the lower end of the blank rests on a shoulder 31 at the bottom of the die. The blank 2 is then set on top of the die 22 and the reciprocating head 21 in such manner that the projection 14 on the blank extends through one of the openings 10 in the base. The reciprocating head 21 then moves to the right as viewed in Fig. 7. The pin 28 first enters the hole 7 in the end of the blank. The end of the die 26 next presses against the central portion of the blank, forcing it back into the cavity or recess 23. Since the cavity or notch 23 is of less width than the width of the blank the wing portions 15 of the blank are bent around into the substantially U-shape shown in Fig. 10. In Figs. 9 and 10 I have not shown the base plate 2, but it is shown in Figs. 6 to 8, inclusive.

When the die 26 forces the blank 13 back into the notch 23 the tongue 14 on the blank projecting through the base plate 2 of the bracket causes the bracket to slide to the right. This is clearly shown in Figs. 7 and 8 wherein it will be seen that the right-hand end of the base member 2 in Fig. 8 is a considerable distance to the right of the position shown in Fig. 7. When the die 26 completes its movement to the right the parts are in the position shown in Fig. 8 and the tongue 14 on the blank is directly under the vertically movable upsetting plunger 29. While the parts are held in this position the plunger 29 is forced down, upsetting the projecting tongue 14 and even upsetting the portion of the metal which passes through the slot 10 in the blank 2. As a matter of fact, the pressure is so heavy that the size of the opening 10 is actually expanded.

Since the blank is firmly held against vertical movement by reason of being confined in the die and by reason of the pin 28 passing through the hole 7 in the blank, the action in this operation is to cause the web of metal forming the rib 3 of the base to be firmly clamped between the riveted head of the projection 14 and the ends of the bent wings 15. As an additional feature to prevent any relative movement of the blank during the upsetting operation, the end of the die 26 is preferably provided with serrations or beads or teeth 26ª which bite into the hot blank while the blank is confined in the notch 23 in the die. After the extension 14 has been riveted over the plunger 29 rises and the head 21 recedes. The spring-actuated kick-out bar 32 then acts to force the blank, which is firmly attached to the base plate 2, out of the recess in the die.

The base plate 2 is then lifted and another blank inserted in place at the front of the die 22. The base plate is then put back into position, but this time the tongue 14 of the second blank will project through the second opening 10 in the base plate. It will be noted that a clearance channel 33 is provided in back of the die block 22 to accommodate those arms which have been rigidly attached to the base plate.

The entire operation of inserting the heated blank and completing its shaping and attaching it to the base plate requires but a few seconds, so that the operation can be carried on with considerable rapidity.

The base member 2 if formed from flat sheet metal can be bent to shape and punched in a single operation, as will be readily understood to those skilled in the art. In place of using flat sheet metal the base member 2 may be formed of rolled stock, in which case the only operation required is the punching of the slots 10, and the forming of the holes 2ª and 2ᵇ. The holes 2ª accommodate screws or bolts by means of which the fixture is secured to a pole or other structure on which it is to be mounted, while the holes 2ᵇ are provided primarily for reducing the weight of the article.

As a modification of the process it is of course apparent that the flat blank 13 can be bent to the shape shown in Fig. 10 before the tongue 14 is inserted through the hole 10 in the base plate.

The invention provides a bracket for fixtures of this kind which is satisfactorily formed of sheet metal and which is rigidly secured to the base member in such manner that it cannot become detached under ordinary conditions of usage.

The method provides for cutting the blank 13 from flat sheet metal whereby a simple type of punching or stamping machine can be employed. The bending over of the wings or reinforcing arms 8 is accomplished in the same heating that the riveting is accomplished, the riveting operation being done at almost the instant the bending operation is finished.

While I have shown and described a particular form of an insulator rack and the preferred way of making it, it will be understood that the invention is not confined to this particular form of rack and that various changes and modifications may be made in the operation and construction of the mechanism within the contemplation of my invention and under the scope of the following claims.

I claim:

1. An article of the class described comprising a one-piece base plate having a sheet metal supporting arm secured thereto, said sheet metal arm having integral flanges thereon the ends of which bear against one face of the base plate, the middle portion of the arm having an extension thereon passing through an opening in the base plate, the inner end of the extension being riveted over whereby the base plate is rigidly clamped between the ends of said flanges and the riveted end of the extension.

2. The method of forming a sheet metal arm and attaching it to a one-piece base plate to form a device of the class described, which comprises forming a blank from a piece of flat sheet metal, which blank has a hole at one end thereof and a tongue in the other end, heating the blank, inserting the tongue through an opening in the base plate adapted to receive it, thereafter folding the side portions of the blank inwardly to form flanges the ends of which extend over the base plate, and then applying pressure to the projecting end of the tongue of the blank to upset the metal and rivet it over, the blank being supported against endwise movement during the upsetting operation, the means which bend the flanges inwardly being utilized to clamp the blank and hold it against endwise movement during the upsetting operation.

3. The method of forming an article of the class described having a one-piece base plate and an arm secured to the base plate projecting therefrom, which comprises forming the base plate with a hole therein, forming a flat sheet metal blank having a tongue projecting from one end thereof, heating the blank, inserting the tongue through the hole in the base plate, bending the sides of the blank over to form flanges the inner ends of which contact with the base plate, then upsetting the tongue to rivet it over and clamp the base plate between the ends of the flanges and the riveted over head.

4. An insulator rack comprising a one-piece base plate formed in the shape of a channel with side flanges thereon and having a sheet metal arm secured to the top side of the channel of said base plate, said arm having an extension passing through the top side of the channel and which is upset on the under face of the plate, said arm also having flanges thereon, the ends of which bear against the outer face of the base plate.

5. An insulator rack comprising a one-piece base plate formed in the shape of a channel with side flanges thereon, a plurality of sheet metal arms secured to the top side of the channel of said base plate, said arms being formed of an integral piece of sheet metal having downwardly turned side flanges, the ends of which bear against the plates, the middle portion of each arm having an extension thereon which passes through an opening in the base plate, the extension being riveted over on the opposite face of the base plate.

6. An insulator rack comprising a one-piece base plate formed in the shape of a channel with side flanges thereon, a plurality of sheet metal arms secured to the top side of the channel of said base plate, said arms being formed of an integral piece of sheet metal having downwardly turned side flanges, the ends of which bear against the plates, the middle portion of each arm having an extension thereon which passes through an opening in the base plate of larger cross-sectional area than the extension of the arm, the extension being riveted over on the opposite face of the base plate.

7. The method of forming an article of the class described having a one-piece base plate projecting therefrom, which comprises forming the base plate with a hole therein, forming a flat sheet metal blank having a tongue projecting from one end thereof, said tongue being of smaller cross-sectional area than the hole in the base plate, heating the blank, inserting the tongue through the hole in the base plate, bending the sides of the blank over to form flanges, the inner ends of which contact with the base plate, then upsetting the tongue to rivet it over and clamp the base plate between the ends of the flanges and the riveted-over head.

In testimony whereof I have hereunto set my hand.

CHAS. FASSINGER.